United States Patent [19]

Zeiss et al.

[11] Patent Number: 4,729,340
[45] Date of Patent: Mar. 8, 1988

[54] METHOD AND APPARATUS FOR POWDER COATING ELONGATED OBJECTS

[76] Inventors: James F. Zeiss, 4231 Ivanhoe Dr.; Allen Newman, 2640 Collins Dr., both of Lorain, Ohio 44053; Gunther J. Lissy, 109 Northwood Hollow Ct., Amherst, Ohio 44001

[21] Appl. No.: 755,957

[22] Filed: Jul. 16, 1985
(Under 37 CFR 1.47)

Related U.S. Application Data

[63] Continuation of Ser. No. 605,292, Apr. 30, 1984, abandoned.

[51] Int. Cl.⁴ .................. B05D 15/04; B05D 15/00
[52] U.S. Cl. ............................ 118/634; 118/630; 118/633; 118/326; 118/308; 118/310; 118/316
[58] Field of Search .............. 118/630, 633, 634, 326, 118/308, 310, 316

[56] References Cited

U.S. PATENT DOCUMENTS

| | | | |
|---|---|---|---|
| 1,944,822 | 1/1934 | Church et al. | 118/326 X |
| 3,589,333 | 6/1971 | Quackenbush | 118/308 X |
| 3,598,626 | 8/1971 | Probst et al. | 427/32 |
| 3,814,002 | 6/1974 | Rombach et al. | |
| 3,870,375 | 3/1975 | Duncan et al. | |
| 3,899,903 | 8/1975 | Lapierre | |
| 3,960,323 | 6/1976 | Ducan et al. | |
| 4,100,883 | 7/1978 | Lupinski et al. | 427/32 X |
| 4,378,728 | 4/1983 | Berkmann | |
| 4,409,009 | 10/1983 | Lissy | |

FOREIGN PATENT DOCUMENTS 2178339 11/1973 France .

Primary Examiner—Shrive P. Beck
Attorney, Agent, or Firm—Wood, Herron & Evans

[57] ABSTRACT

A method and apparatus for the powder coating of elongated articles such as wire and pipe is provided comprising a powder spray booth having a top, bottom and opposed spaced side and end sections. The opposed end sections are each provided with a plurality of spaced openings each formed to receive an elongated article. Partition means are disposed in the spaces between adjacent openings and extend longitudinally along the powder spray booth forming compartments therebetween in which such elongated articles individually travel and receive a powder coating from separate electrostatic spray guns.

2 Claims, 2 Drawing Figures

METHOD AND APPARATUS FOR POWDER COATING ELONGATED OBJECTS

This application is a continuation of application Ser. No. 605,292, filed Apr. 30, 1984, now abandoned.

FIELD OF THE INVENTION

This invention relates to coating systems, and, more particularly, to a method and apparatus for powder coating one or more elongated products such as wire, rods or pipe.

BACKGROUND OF THE INVENTION

The practice of electrostatic spraying of protective liquid coating materials such as paint is well established and commercially practiced. In recent years, however, there has been a great deal of interest and development in electrostatic spraying of solid particulate materials. These so-called powder spraying systems enable solid paints or other coating materials to be applied to a substrate without a liquid carrier or solvent. Advantages of powder spraying systems over liquid spraying systems include eliminating the cost of the liquid carrier, increased ease of application and control, less expensive application equipment, a wider range of film thickness capability and the elimination or at least a dramatic reduction of exhaust gases expelled to the atmosphere.

Electrostatic powder spray systems operate on the principle of transporting a finely divided powder, generally on the order of from 10 to 50 microns, to a spray gun or spray head while entrained in an air or gaseous stream. The powder is subsequently transferred from the gun to the substrate by an electrostatic charge applied to the powder and an opposite charge on the substrate. Once applied to the substrate the powder is generally adhered as a film by heat fusion.

Powder spraying systems such as disclosed in U.S. Pat. No. 3,960,323 and other patents assigned to the assignee of this invention, are currently used for many applications and are gaining widespread acceptance commercially. Such systems generally include a powder spray booth having top, bottom, side and end sections in which a plurality of electrostatic spray guns and a powder filtering system are disposed. In most known systems, the top of the booth is formed with a slot to receive an endless conveyor along which a plurality of articles to be coated are disposed. Each of the articles is suspended from the conveyor by one of a plurality of spaced hooks or other convenient means to place them in general alignment with the electrostatic spray guns. The spray guns are disposed at selected locations within the powder booth to create a uniform spray pattern of powder so as to assure each of the articles passing through the spray booth receives a complete and even coating of powder.

While the process of electrostatic spraying of solid particulate materials has been applied to a variety of articles, prior to this invention the coating of essentially continuous or elongated articles such as pipe, rods or wire has generally been conducted by other methods such as the electrostatic spraying of a liquid coating. For the reasons outlined above, coating with solid particulate materials is much more desirable than using liquid materials. However, existing designs of powder spray systems are incapable of efficiently accommodating continuous elongated articles. While commonly used conveyor systems such as described above for moving articles through a powder spray booth could conceivably be adapted to transport pipe, rods, wire or similar articles, it is probably that only a single article of this nature could be handled at one time to assure the proper coating is applied. Particularly for small guage wire or similar articles, this would be an extremely inefficient and uneconomical use of existing powder spray booths.

It has therefore been an object of this invention to provide a method and apparatus for the powder coating of elongated articles.

It is another object of this invention to provide a method and apparatus for the simultaneous coating of a plurality of pipe, rod, wire or similar elongated articles by electrostatic spraying of solid particulate materials.

It is another object herein to provide a method and apparatus for the simultaneous electrostatic spraying of solid particulate materials to form a coating on a plurality of elongated articles in which the spraying pattern of electrostatic spray guns is carefully controlled to assure complete and uniform coating of such articles.

SUMMARY OF THE INVENTION

These and other objectives are accomplished in an apparatus for powder coating elongated objects according to this invention comprising a powder spray booth having a top, bottom, and opposed, spaced side and end sections. The opposed end sections are each provided with a plurality of spaced openings which are formed to receive a separate elongated article. Advancing means engage each elongated article and operate to move them between respective aligned openings in the opposed end sections through the powder spray booth. Partitions are mounted within the powder spray booth in the spaces between each of the openings. The partitions extend perpendicularly relative to the end sections along at least a portion of the length of the powder spray booth so as to form compartments or divided areas to separate the individual continuous articles moving through the openings in the end sections. At least one upper and lower electrostatic spray gun is disposed at appropriate intervals along each of the compartments so as to create a spraying pattern of solid particulate material within each compartment for the individual continuous articles. The partitions effectively prevent most of the powder from spray guns in adjacent compartments from disrupting and/or disturbing the spraying pattern of powder within each individual compartment. This assures even and complete coating of each continuous article.

Although the compartmentalized structure of the powder spray booth herein is different from existing powder spray booths, it has been found that conventional filtering systems may be utilized in connection with the spraying of elongated articles according to the method and with the apparatus of this invention. In addition, it is contemplated that a variety of known means for advancing such elongated articles through the spray booth between the opening in the end sections may be utilized.

DESCRIPTION OF THE DRAWINGS

The structure, operation and advantages of this invention will become apparent upon consideration of the following description taken in conjunction with the accompanying drawings wherein.

DETAILED DESCRIPTION OF THE INVENTION

Figure 1:
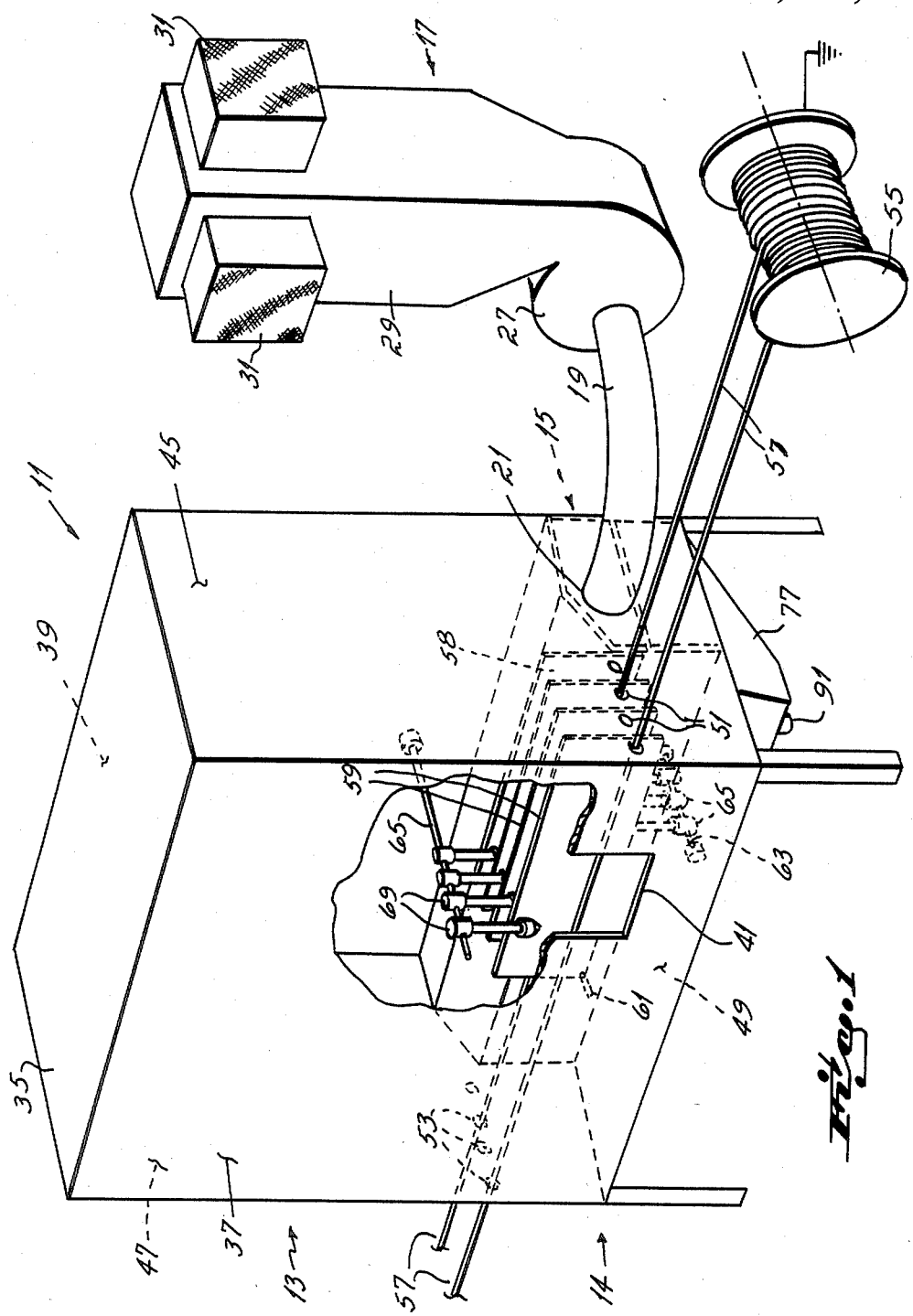
FIG. 1 is an overall perspective view in partial cross-section of the powder spraying system of this invention.

Referring now to the drawings, an apparatus according to this invention for the powder coating of elongated articles is labeled generally with the reference numeral 11. The apparatus 11 generally includes a spray booth 13 having a base portion containing a filter recovery system 15 and an absolute filter 17 connected to the filter/recovery system 15 through a duct 19. The duct 19 connects to the filter/recovery system 15 by means of a quick-disconnect connection 21 mounted in hole 23 formed in the base portion of the spray booth 13. Duct 19 communicates the interior of the filter/recovery system 15 to a blower 27 associated with absolute filter 17 which creates a negative pressure in the filter recovery system 15 as will be more fully discussed below. The blower 27 exhausts into a plenum 29 having filters 31 which clean any air discharged therethrough.

The spray booth 13 defines a controlled area for spraying powder according to the method of this invention and comprises a ceiling section 35, opposed side walls 37 and 39 with side wall 37 having an access opening 41 formed therein, opposed end walls 45 and 47 and a floor area 49. As mentioned above, prior art spray booths generally include a ceiling section having an elongated opening to receive a conveyor upon which articles to be coated are disposed for movement through the spray booth. As shown in the drawings, the ceiling section 35 of spray booth 13 is continuous although it may be open for the admission of air into the booth so as to obtain proper air flow volumes and velocity through the booth.

To accommodate elongated articles such as wire, pipe or rods, the spray booth 13 of this invention is provided with end walls 45 and 47 having spaced aligning openings 51 and 53, respectively, which are shaped and sized to receive a particular elongated article to be coated. As shown in FIG. 1, a reel 55 of wires 57, which reel 55 is grounded, is disposed adjacent the spray booth 13 in alignment with the openings 51 in end wall 45. Although a plurality of wires 57 are shown and used for purposes of illustrating the invention herein, it should be understood that other elongated articles such as rods, pipes and the like may be accommodated by apparatus 11. In the embodiment of this invention shown herein, four spaced openings 51 are formed in end wall 45 to receive a corresponding number of wires 57 which enter the spray booth 13 through the openings 51 and exit spray booth 13 through the four openings 53 formed in end wall 47 which align with openings 51. Although not shown in the drawings, the openings 51 and 53 may be made larger or smaller and in shapes other than circular depending upon the type of elongated article to be coated in spray booth 13. For example, pipe of several inches in diameter could be accommodated in spray booth 13 by enlarging openings 51 and 53 and providing suitable means to advance such pipe through the spray booth 13.

Figure 2:
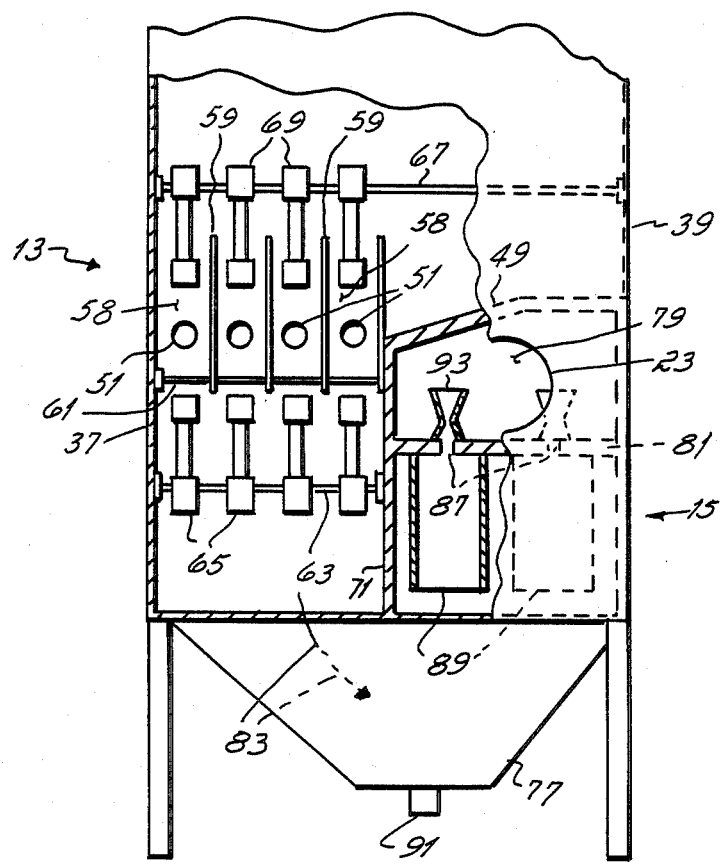
FIG. 2 is an end view in full elevation of the powder spray system of FIG. 1.

A series of partitions formed of a thin sheet material and each labeled with the reference numeral 59 are mounted at one end to the end wall 45 and extend perpendicularly thereto longitudinally along at least a portion of the length of spray booth 13 where they are secured adjacent their other end to a slat 61. The partitions 59 are mounted in the space between adjacent openings 51 such that each individual wire 57 extending through a separate opening 51 is disposed within an isolated compartment 58 formed by adjacent partitions 59. As shown in FIG. 2, one of the compartments 58 is formed by a partition 59 and the side wall 37. In addition, it should be understood that the use of four openings 51, 53 herein is intended to illustrate the concept of this invention and a greater or lesser number of openings could be utilized with a corresponding number of partitions 59 as desired.

The purpose of at least partially isolating each wire 57 within a separate compartment 58 is to control the spray pattern of powder applied to such wires 57. As shown in the drawings, a lower rod 63 extends between side wall 37 and an interior side wall 71 of the filter recovery system 15, along which four lower electrostatic spray guns 65 are mounted. Spray guns 65 are of known construction and are operable to apply an electrostatic charge to solid particulate material or powder and spray such powder onto a substrate such as the wires 57. As shown in the drawings, one spray gun 65 is disposed below each of the wires 57 within each of the compartments 58. In addition, an upper rod 67 is disposed between side walls 37 and 39 a distance above and laterally spaced from lower rod 63 and end wall 45. The upper rod 67 acts as a mount for four upper spray guns 69, which are identical in structure and operation to lower spray guns 65. To assure complete and even coverage of each wire 57, there is an upper spray gun 69 disposed within each compartment 58 immediately above the wires 57.

As is well known, commercially available electrostatic spray guns produce a defined spraying pattern of powder for the coating of articles within a spray booth. The spacing of such spray guns within a powder spray booth and the volumetric flow of powder therethrough must be carefully controlled in any powder spray booth to achieve the desired thickness and coverage of the powder coating. It has been found that for continuous articles such as the wire 57, the compartmentalized structure provided by partitions 59 in spray booth 13 is necessary to properly control the spray pattern of upper and lower spray guns 65 and 69. Accordingly, one lower spray gun 65 and one upper spray gun 69, which are spaced apart, are provided for each compartment 58 to properly coat each individual wire 57. Such partitions 59 at least partially isolate the individual wires 57 from one another and from the spray guns 65, 69 in an adjacent compartment 58 to achieve the proper coating thickness and coverage.

Although not illustrated in the drawings, additional spray guns 65, 69 may be utilized in this invention and the length of partitions 59 may be shortened or extended, depending on the requirements of a particular application. For example, the number and flow rate of spray guns 65, 69 required to properly coat a relatively thin guage wire would be must less than that required for pipe having a 6 inch diameter. The powder spray booth 13 of this invention may be readily adapted to accommodate such wide ranges of article dimensions, by simple altering the length of partitions 59 and providing more or less electrostatic spray guns 65 and/or 69. Thus, coating of large pipes, for example, may require the lengthening of partitions 59 and the addition of more spray guns 65 and/or 69 in comparison to the embodiment shown in the drawings.

Referring now to the base portion of the spray booth 13, the details of the filter/recovery system 15 utilized herein will be discussed. The structure and operation of the filter/recovery system 15 are known in the art and will be discussed briefly herein to illustrate the complete operation of apparatus 11. For example, one cartridge type filter recovery systems suitable for use in combination with the booth 13 is disclosed in Browning U.S. Pat. No. 4,277,260 issued July 7, 1981. The embodiment of the filter/recovery system 15 shown in the drawings generally includes an interior side wall 71, the lower portion of side wall 39, a sloped floor area 49, the lower portion of end walls 45 and 47 and three powder collectors 77 only one of which is shown. A clean air chamber 79 is disposed between the angled floor area 49 and extends between the upper portion of side wall 39, the angled floor area 49, the upper portion of interior side wall 71 and a bottom chamber wall 81.

As mentioned above, a hole 23 is formed in end wall 45 allowing clean air chamber 79 to communicate through the duct 19 with absolute filter 17. Thus, a negative pressure is created in clean air chamber 79 by the operation of blower 27 which draws air therethrough.

The interior side wall 71 extends downwardly from the angled floor area 49 to form an air flow passage 83 between it and the side wall 37. The air flow passage 83 is elongated in the direction of travel of the wire 57 within spray booth 13 and forms a path for the excess powder which does not adhere to the wire 57 to flow into the powder collectors 77.

The clean air chamber 79 is provided with multiple holes 87 formed in the bottom chamber wall 81 each of which is capped by a static cartridge filter 89. The static cartridge filters 89 may be removably attached to the bottom chamber wall 81 by any suitable means. Although not shown in the figures, the holes 87 in bottom chamber wall 81 and the associated static cartridge filters 89 may be arranged in three banks of 6 filters for a total of 18 filters to achieve an acceptable filtering capability.

Below the banks of cartridge filters 89, each of the three powder collectors 77 tapers downwardly in the shape of a pyramid to receive excess powder from the air within spray booth 13. At the apex of each pyramid shaped powder collector 77 is a venturi pump 91 or other suitable means to transport the collected powder to a recycling bin or other storage means for future use or discarding.

Interiorly of the clean air chamber 79, venturi throats 93 are positioned above and around each of the holes 87 in bottom chamber wall 81 through which filtered air passes. Air solenoid means (not shown) may be associated with each of the venturi throats 93 to provide a stream of air for dislodging excess powder which may collect therein. Such dislodged powder falls into respective powder collectors 77.

In operating the powder spraying apparatus 11, the blower 27 is first activated to create a negative pressure in the clean air chamber 79 and thereby cause air flow inwardly from outside the spray booth 13 through the access opening 41 in side wall 37. This air flow, after passing through the upper portion of spray booth 13, flows downwardly through air flow passage 83 and into the powder collectors 77. The air flow is then caused to change direction from generally downwardly toward the powder collectors 77, to an upward direction through static cartridge filters 89 and into clean air chamber 79. The now filtered air then flows through the duct 19 to and through the absolute filter 17 where any residual powder which has passed through the cartridge filters 89 is extracted. The cartridge filters 89 are generally effective in extracting more than 99% of the powder entering the filter/recovery system 15 so that very little powder reaches the filters 31 of absolute filter 17. Clean air is then exhausted from the absolute filter 17 back into the plant or to the atmosphere.

As soon as the air flow is initiated by blower 27, the powder may be turned on and sprayed by upper and lower spray guns 65 and 69 onto the wires 57 within each of the compartments 58 formed by partitions 59. As mentioned above, the powder particles are conventionally charged with a high voltage, electrostatic charge with the wire 57 or other continuous article being grounded through the reel 55 or other means utilized to advance such articles through spray booth 13. The electrostatic charge increases the percentage of powder deposited onto the wires 57 and assists in retaining such particles on wires 57.

All oversprayed powder is maintained in the spray booth 13 by the incoming air flow through the booth openings 41. The oversprayed material either falls by gravity to the bottom of the spray booth 13 or becomes entrained in the air flow moving downwardly in the spray booth 13 through air flow passage 83. A large portion of the powder entering air flow passage 83 falls by gravity to the bottom of one of the pyramid shaped powder collectors 77. The remaining powder is airborne and it either falls out of the air and collects in the powder collectors 77 as the air flow is changed from a generally downward direction in the air flow passage 83 to an upward direction toward the cartridge filter 89, or such powder filtered out of the air is by cartridge filters 89.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A powder spray booth for coating elongated articles with a particulate powder material comprising:
   a generally rectangular-shaped booth having opposed sides, opposed end sections, a ceiling and a floor;
   a plurality of partitions each having an upper edge and a lower edge;
   means for mounting said partitions within said booth, each of said partitions extending longitudinally of said booth and each being mounted in a vertical plane parallel to said sides of said booth, said partitions being mounted between said ceiling and floor of said booth with said upper edge thereof being spaced a substantial distance from said ceiling and said lower edge thereof being spaced a substantial distance from said floor, said partitions being spaced from one another to form a compartment between adjacent partitions;
   electrostatic powder spraying means mounted within said booth and adapted to spray particulate powder material into each of said compartments between adjacent partitions;

means for moving elongated articles through said compartments within said booth, said electrostatic powder spraying means being adapted to spray particulate powder material onto the elongated articles moving within said compartments for coating thereof; and filter/recovery means for collecting and filtering oversprayed particulate powder material dispersed from said electrostatic powder spraying means but not coating the elongated articles, the oversprayed particulate powder material being circulated beneath said partitions for collection in said filter recovery means.

2. The powder spray booth of claim 1 in which electrostatic powder spraying means includes at least one upper powder spray gun mounted above the elongated articles within each of said compartments, and at least one lower powder spray gun mounted below the elongated articles within each of said compartments.

* * * * *